3,660,509
PREPARATION OF CYCLIC ALKENES
Robert P. Arganbright, Houston, Tex., assignor to Petro-Tex Chemical Corporation, Houston, Tex.
No Drawing. Filed Aug. 11, 1969, Ser. No. 849,934
Int. Cl. C07c 13/16
U.S. Cl. 260—666 A                 10 Claims

ABSTRACT OF THE DISCLOSURE

A cyclic alkene can be prepared by the intramolecular reaction of an unconjugated diolefin over a supported Group VI–B or VII–B metal oxide; for example, 1,7-octadiene reacts with itself when passed over $MoO_3$ on alumina to give cyclohexene and ethylene at 96 percent conversion and 90 percent selectivity (based on 1,7-octadiene feed and cyclohexene product respectively).

---

The present invention relates to the preparation of cyclic alkenes from unconjugated linear diolefins.

It has now been found that unconjugated diolefins will react over a metal containing catalyst to produce a cyclic alkene and a linear alkene having a total number of carbon atoms equal to that of the starting diolefin.

Briefly stated, the invention is a process for preparing cyclic olefinic compounds having at least 5 carbon atoms comprising contacting an unconjugated diolefin and a catalytic composition comprising a metal oxide of a metal from Groups VI–B and VII–B of the Periodic Table on a catalyst support at a cyclization temperature. The reactant material is an unconjugated diolefin having the configuration $X-HC=HC-(H_2C)_n-HC=HC-Y$ wherein X and Y are

or hydrogen, R is a radical of alkyl, aryl, aralkyl, alkaryl, cycloalkyl, polycycloalkyl or hydrogen, m is an integer of 0–20 and n is an integer of 3–36. Some suitable R radicals are methyl, ethyl, butyl, nonyl, hexadecyl, heneicosyl, hexatriacontyl, phenyl, naphthyl, tolyl, benzyl, cyclopropyl, cyclobutyl, cyclopentyl, bicyclo (2,2,1) heptyl, adamantyl, and the like. Of particular interest are the reactants where X and Y are

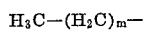

or hydrogen. It has been found that the use of diolefins when n is less than 3 does not result in a recoverable cyclic product.

The reaction can be depicted by:

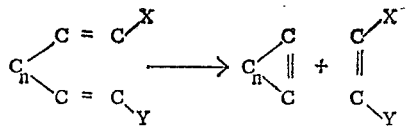

where n, X and Y have the significance previously given.

The cyclic alkenes prepared by the present process have wide utility as chemical intermediates. Cyclohexene, for example, is easily dehydrogenated to benzene or hydrogenated to cyclohexane. The cyclic alkenes are also employed in Diels-Alder reactions for the preparation of insecticides, pesticides and the like or modifying agents in various polymers such as ethylenepropylene terpolymer. The higher cyclic alkenes, i.e., $C_{16}$ or more carbon atoms are intermediates in the preparation of perfume components, for example, 9-cycloheptadecene-1-one (civetone).

The unconjugated diolefins employed can be represented by the general formula

where X, Y, m and n have the significance previously given. A preferred group of diolefin reactants would be one where Y is hydrogen, X is

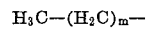

or hydrogen, m is 0–7 and n is 3–22, a more preferred group of diolefin reactants would be where Y is hydrogen, X is $H_3C-(H_2C)_m-$ or hydrogen, m is 0–2 and n is 3–18. Some suitable unconjugated diolefins include 1,6-heptadiene, 1,7-octadiene, 1,6-octadiene, 1,8-nonadiene, 1,7-nonadiene, 1,9-decadiene, 1,10-undecadiene, 2,6-dimethyl-1, 7-nonadiene, 2,6-dimethyl-2,7-nonadiene, 2,6-dimethyl-1, 8-decadiene, 2,6-dimethyl-2, 8-decadiene, 2,6-dimethyl-1, 8-undecadiene, 2,6-dimethyl-2, 8-undecadiene, 2,11-dimethyl-2, 10-dodecadiene, 1,15-hexadecadiene, 1,19-eicosadiene and the like.

The diolefins can have branched or unbranched chains. There can also be pendant on the diolefin other hydrocarbon groups such as cycloalkyl, aryl, aralkyl and alkaryl including, for example, cyclopropyl, cyclobutyl, cyclopentyl, cyclohexyl, phenyl, nephthyl, benzyl and tolyl.

The catalytic composition consists of a catalyst and support. The active catalytic component is a metal oxide from Group VI–B and VII–B of the Periodic Table. A preferred catalyst metal is molybdenum, tungsten or rhenium. The metal oxide is preferably introduced in a high positive oxidation state, e.g., hexavalent molybdenum or tungsten or heptavalent rhenium. When the catalyst is provided in some other form pretreatment is usually employed to convert it to the oxide. The metal oxide is customarily deposited on a support material, usually about 0.5 to 30 percent by weight calculated as metal oxide on the support. The catalyst can be either a single metal oxide or a mixture of metal oxide as described.

The catalyst support is any material on which the catalyst can be suitably deposited so as to allow maximum contact with diolefin reactants during the process of cyclization. Some suitable materials are silica, silica-alumina, alumina, firebrick, kieselguhr, zeolites or the like. Preferred supports are alumina and silica-alumina and contain from 1 to 100 percent by weight alumina. Particularly suitable supports are those comprising at least a major proportion of alumina with no more than minor proportions of other components, specifically a suitable catalyst support contains at least 75 percent by weight alumina, more preferably 95 percent by weight alumina with the remainder being made of essentially inert materials, such as silica or magnesia.

The preparation of the supported catalytic compositions is effected by conventional techniques of dry-mixing, coprecipitation, impregnation, ion exchange and the like. The catalyst compositions components are introduced in one operation or in separate stages. The order in which the various components are added to the support is not critical. It is the usual practice to pretreat or activate the catalyst composition prior to utilization in the process. The precise method of pretreatment employed will depend to some extent on the nature and form of the catalyst components. In general, however, the pretreatment comprises heating an initially prepared supported catalyst in an atmosphere of non-reducing gas such as nitrogen, argon, or oxygen containing gas. One function served by the pretreatment is to convert the catalyst into the form of the oxides if these components were not initially provided as oxides. For example, initial catalyst components such as ammonium molybdate, ammonium metatungstate, ammonium perrhenate and the like are converted to corresponding oxides by heating in a non-reducing atmosphere.

It is desirable that at least a major proportion of the catalyst components initially be present in the highest oxidation state possible and, if not, the desired elevation of positive oxidation is effected by pretreatment in the presence of oxygen, alone or in mixtures with other gases. Regardless of the initial form of the catalyst components, the formed catalyst should be maintained at elevated temperatures for a time. The pretreatment temperature is not critical and is typically in the range of 300–750° C. Pretreatment times typically range from 1 to 12 hours. Subsequent to pretreatment, the supported catalyst composition is usually flushed with inert gas to remove residual traces of oxygen or absorbed water and returned to room or reaction temperature in an oxygen free atmosphere. The finished catalyst is employed in any conventional form such as powder, flakes, spheres, pellets, or the like.

The support can be pelleted or extruded for fixed or moving bed systems; preferably they are cylindrical, being on the average 4 mm. in diameter and length. They may be of much smaller size for fluidized systems ranging typically from about 100 to 300 mesh (0.15 to 0.04 mm.) in size.

The reaction system is heterogenous which means that all of the components thereof are not in the same state or phase. In the present process the diolefin feed is a fluid, i.e. liquid or vapor whereas the catalytic composition is a solid.

The cyclization reaction is carried out by contacting the unconjugated diolefin feed in either liquid or gaseous phase with the solid catalytic composition. The reaction is conveniently carried out as a continuous process in a tubular reactor wherein the catalytic composition is maintained in a fixed or fluidized bed while the diolefin feed is passed into the reactor in a gaseous state. Alternatively, a batch type operation can be employed by agitating the diolefin reactant and catalytic composition together in a suitable reactor such as an autoclave. In the continuous process a convenient method of measuring diolefin additions is in terms of weight hourly space velocity (WHSV) which measures the weight of diolefin which contacts units weight of catalytic composition per hour and is in units of reciprocal hours ($hr.^{-1}$). It is convenient to add the olefin feed to the reactor at a constant pressure; for example, 17 to 1500 p.s.i.g. at a WHSV typically in the range of 0.1 $hr.^{-1}$ to 1.0 $hr.^{-1}$.

The reaction is typically carried out at cyclization temperatures in the range of 20 to 400° C. The range recited encompasses the operational ranges of the various catalyst, which although functioning in different sectors of the recited range operate in the same manner to give substantially similar results. For example, rhenium oxide operates in the lower portion of the range, i.e., 20 to 80° C., molybdenum oxide operates at intermediate temperatures, 75–150° C. and tungsten oxie operates at temperatures of 300° C. or more. The selection of an optimum cyclization temperature within the range recited then will depend, to a greater or lesser extent, not only on the nature of the diolefin being reacted but on the catalytic composition employed, a determination easily made by the skilled technician in regard to each particular fact situation. The process is typically run at atmosphere pressure although superatmospheric pressures up to 150 atmospheres, preferably up to 70, for example, can be used, particularly in a liquid phase reaction. The reaction products can be recovered by conventional means such as fractional condensation, fractional distillation, solvent extraction, extractive distillation or the like.

The products of the present invention are two olefinic compounds having a total number of carbon atoms equal to the number of carbon atoms of the diolefin reactant, and having a number of ethylenic linkages equal to the number of ethylenic double bonds of the reactant, i.e., two. Some specific illustrations are 1,6-octadiene yielding cyclopentene and propene; 1,7-octadiene yielding cyclohexene and ethylene; 2,11-dimethyl-2, 10-dodecadiene yielding cyclooctene and 2,3-dimethyl-2-butene; 1,19-eicosadiene yielding cyclooctadecene and ethylene.

EXAMPLE 1

A $MoO_3$-alumina catalyst was prepared by impregnating dry commercial alumina, ⅛" pellets (Alcoa H–151) with sufficient ammonium molybdate hydrate (in solution) to provide 10 weight percent molybdenum oxide on the support. The impregnated alumina was heated to 550° C. for about 2 hours under a flow of air. The catalytic composition was then cooled to room temperature and placed under nitrogen.

EXAMPLE 2

1,7-octadiene was run over a 10 percent $MoO_3$-alumina (previously used) at a liquid feed rate of 20 ml./hr. (WHSV of 0.7 $hr.^{-1}$) at 82° C. After one hour off gas analysis by gas liquid phase chromatograph gave

| | Weight percent |
|---|---|
| Ethylene | 38.0 |
| Propylene | 13.1 |
| Cyclopentene and cyclopentane ($C_5$'s) | 4.8 |
| Cyclohexene | 37.1 |
| 1,7-octadiene | 5.9 |
| Isomers of octadiene | 1.1 |

EXAMPLE 3

The catalyst employed in Example 2 was regenerated by heating in a stream of air at 550° C. for about 2 hours. The catalyst was cooled to 95° C. and a feed of 1,7-octadiene at 20 ml. liquid feed per hours (WHSV 0.7 $hr.^{-1}$) begun. After 1 hour GLPC analysis showed.

| | Weight percent |
|---|---|
| Ethylene | 58.2 |
| Cyclohexene | 37.0 |
| $C_5$'s | 4.8 |
| Propylene | trace |

A liquid sample trapped (wet ice) over a 20 minute interval after 2 hours on stream gave

| GLPC | Weight percent |
|---|---|
| Cyclohexene | 85.8 |
| 1,7-octadiene | 5.7 |
| Isomers of octadiene | 1.8 |
| $C_4$ and $C_5$ | 6.7 |

EXAMPLE 4

A freshly activated 10 percent $MoO_3$-alumina catalyst was heated to 100° C. A feed of 1,6-octadiene is fed at a rate of 20 ml. liquid/hr. (WHSV 0.5 $hr.^{-1}$). The conversion based on (GLPC) is about 60 percent. The yield of cyclopentene was 52 percent per pass. Principal products were cyclopentene, propylene, $C_4$ and $C_5$ (unidentified) and some 1,7-octadiene.

EXAMPLE 5

The previous catalyst was regenerated at 550° C. under a flow of air, then was cooled to 95° C. under nitrogen. 1,9-decadiene is fed to the reactor at a flow rate of 20 ml. liquid/hour (WHSV 0.5 $hr.^{-1}$). After a conversion of 37 percent, the yield of cyclooctene is 29 percent per pass.

EXAMPLE 6

Using a freshly activated 10 percent $MoO_3$-alumina catalyst at 95° C. with a feed of 50:50 1,19-eicosadiene: n-heptane at 10 ml. liquid/hr. (WHSV 0.26), a conversion of 56 percent is obtained. The yield of cyclooctadecene was about 8 percent per pass.

In the present specification and claims reference is made to the Periodic Table. By this term is meant any of the standard table of elements in use at the present time and so designated; for example, that found in Handbook of Chemistry and Physics, 45th ed., 1964–1965, The Chemical Rubber Co., Cleveland, Ohio, p. B–2.

The invention claimed is:

1. A process for preparing cyclic olefinic compounds having the structural formula:

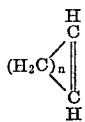

and monoolefic compounds of the structural formula

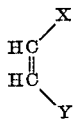

comprising contacting an unconjugated diolefin having the structural formula

where X and Y are R—(H$_2$C)$_m$ or hydrogen, R is a radical of alkyl, aryl, aralkyl, alkaryl, cycloalkyl, polycycloalkyl or hydrogen, $m$ is an integer of 0–20 and $n$ is an integer of 3–36, with a catalytic composition consisting of a metal oxide of Mo, W or Re on a catalyst support of 95% alumina with the remainder being essentially inert materials, at a cyclization temperature in the range of 20 to 80° C. for Re catalysts, 75 to 150° C. for Mo catalysts and 300 to 400° C. for W catalysts at 1 to 150 atmospheres.

2. The process according to claim 1 wherein X and Y are

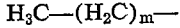

or hydrogen.

3. The process according to claim 2 wherein Y is hydrogen, X is

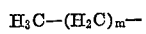

or hydrogen, $m$ is 0–7 and $n$ is 3–22.

4. The process according to claim 3 wherein $m$ is 0–2 and $n$ is 3–18.

5. The process according to claim 4 wherein the metal oxide is molybdenum oxide.

6. The process according to claim 5 wherein the support comprises alumina.

7. The process according to claim 6 wherein the unconjugated diolefin is 1,6-heptadiene.

8. The process according to claim 6 wherein the unconjugated diolefin is 1,7-octadiene.

9. The process according to claim 6 wherein the unconjugated diolefin is 1,6-octadiene.

10. The process according to claim 2 wherein the metal oxide is molybdenum oxide.

References Cited

UNITED STATES PATENTS

| | | | |
|---|---|---|---|
| 3,083,246 | 3/1963 | Holzman | 260—683.15 |
| 3,544,647 | 12/1970 | Pennella | 260—683 D |
| 3,546,314 | 12/1970 | Larson | 260—666 A |
| 3,538,180 | 11/1970 | Reusser | 260—683 D |
| 3,579,602 | 5/1971 | Reusser | 260—666 A |

DELBERT E. GANTZ, Primary Examiner

V. O'KEEFE, Assistant Examiner

U.S. Cl. X.R.

260—683 D